Dec. 6, 1960

R. A. CAMPBELL 2,963,653

OPTIMUM BIASING BINARY THRESHOLD DEVICE FOR RESPONDING TO PULSES IN PRESENCE OF NOISE

Filed June 7, 1955

INVENTOR
RICHARD A. CAMPBELL

BY

Henry Heyman
ATTORNEY

United States Patent Office 2,963,653

Patented Dec. 6, 1960

2,963,653

OPTIMUM BIASING BINARY THRESHOLD DEVICE FOR RESPONDING TO PULSES IN PRESENCE OF NOISE

Richard A. Campbell, Los Angeles, Calif., assignor to Hughes Aircraft Company, Culver City, Calif., a corporation of Delaware Filed June 7, 1955, Ser. No. 513,652

4 Claims. (Cl. 328—165)

The present invention relates to threshold circuits and more particularly to an optimum binary threshold circuit that reduces to substantially the theoretical minimum the number of errors made in distinguishing between received message signal pulses and noise both varying in an unrelated manner.

A binary threshold circuit is an electronic mechanism that produces, in response to one or the other of two types of input signals, an output signal at one or the other of two voltage levels. More particularly, the binary threshold circuit basically comprises an electron discharge device biased beyond its cut-off value to a voltage level corresponding to the anticipated noise level conditions. This biasing voltage level is commonly known as the threshold setting and, in response to message signal pulses whose voltage amplitude exceeds the threshold setting, the threshold circuit produces the output signal at one of the two possible voltage levels. On the other hand, in the absence of a message signal pulse, that is, when the voltage amplitude of the input signal is less than the threshold setting, the threshold circuit produces the output signal at the other of the two possible voltage levels.

One of the principal problems encountered in the prior art with the use of this type of circuit is its relatively great susceptibility to error which may be caused by interference signals, such as noise. One type of error, for example, is known as commissive error. In this case the amplitude of a noise signal applied to the threshold circuit exceeds the threshold setting of the circuit and, thereby, causes the circuit to produce the output signal at the incorrect output voltage level. Another type of error is known as omissive error. In this case, a noise signal and a message signal pulse are simultaneously applied to the threshold circuit, the polarity of the noise signal being opposite to that of the message pulse. As a result, the amplitude of the pulse is reduced to a value of voltage below that of the threshold setting so that the output signal is again produced at the incorrect voltage level.

In either case, the threshold circuit makes an incorrect decision as to the presence of a message signal pulse, in the first case indicating the receipt of a pulse when no such pulse has in fact been applied to the circuit and in the second case by indicating the absence of a pulse when a pulse has actually been applied to the circuit.

It is, therefore, an object of the present invention to provide an optimum binary threshold circuit that reduces to substantially the theoretical minimum the sum of the commissive and omissive errors made in distinguishing between received message and noise signals varying in an unrelated manner.

It is another object of the present invention to provide a threshold circuit having a mathematically determined threshold setting that yields the least number of errors in distinguishing between received message and noise signals.

It is a further object of the present invention to provide a threshold circuit that utilizes received message and noise signals to bias itself at the mathematically determined value of the optimum threshold setting, thereby increasing to a theoretical maximum the probability of correct signal detection.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only, and is not intended as a definition of the limits of the invention.

Figure 2:
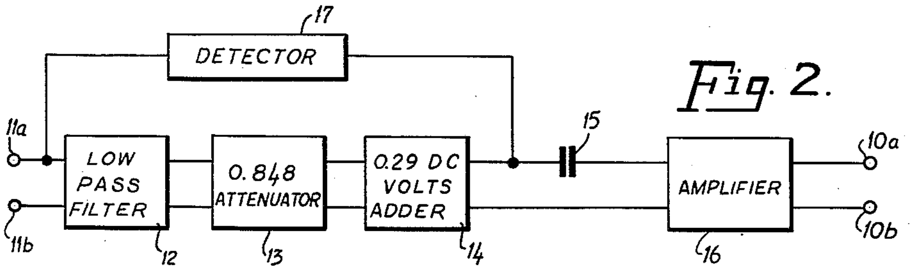
Fig. 2 is a block diagram of an embodiment of an optimum binary threshold circuit of the invention.

According to the basic concept of the present invention, the threshold circuit operates on received signal and noise voltages to produce a self-biasing voltage that is substantially equal to the mathematically calculated optimum threshold setting for the circuit. More particularly, the optimum threshold setting of a threshold circuit is taken to be that setting which yields the least number of errors, and it is easily established that this optimum threshold voltage is a solution to the equation $$(1-P)W_1(x)-(P)W_2(x)=0 \qquad (1)$$

where P is the priori probability of a message signal pulse occurring, $x$ is the amplitude of the instantaneous voltage applied to the circuit normalized to the root-mean-square noise voltage, $W_1(x)$ is the probability distribution of $x$ when a message signal is absent, and $W_2(x)$ is the probability distribution of $x$ when a message signal pulse is present.

The solution to Equation 1 yields $X_0$ which is the optimum threshold setting as a function of $a$, $a$ being the peak voltage of the message signal pulses normalized to the root-mean-square value of the noise voltage. Thus, $$X_0=f(a) \qquad (2)$$

The average value of the signal plus noise multiplied by the probability of occurrence P plus the average value of noise alone multiplied by (1—P) gives the average value $m$ of the composite distribution. This average value is also a function of $a$. Thus, $$m=g(a) \qquad (3)$$

It will be recognized by those skilled in the art that while Equations 2 and 3 are functions of the message signal magnitude, they do not establish the time when the signal is present or absent.

It is also possible to write from Equation 3

$$a=h(m) \qquad (4)$$

Accordingly, $X_0$ may be written by combining Equations 2 and 4 as $$X_0=f[h(m)]=F(m) \qquad (5)$$

which relates the optimum threshold setting or bias to functions of the average value of the voltages applied to the threshold circuit.

Figure 1:
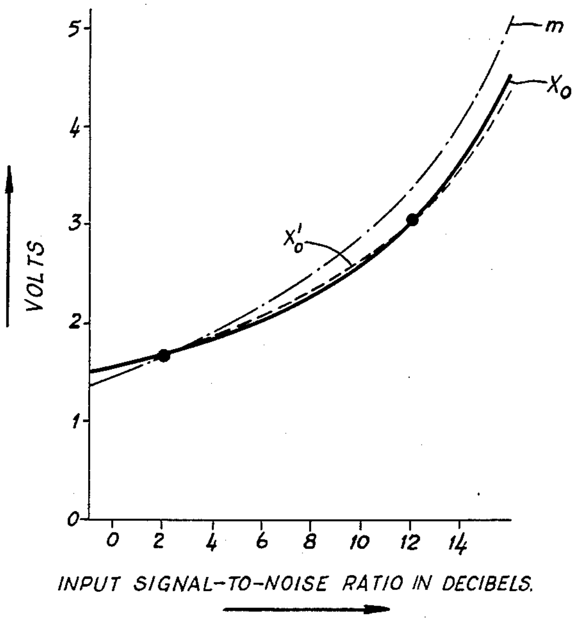
Fig. 1 is a graph illustrating, first, the theoretical optimum threshold setting in volts as a function of the signal-to-noise ratio, second, the average value of the composite distribution of equally likely signal plus noise and noise alone as a function of the signal-to-noise ratio, and, third, an empirical approximation of the theoretical optimum threshold setting.

Consider, for example, an amplitude-modulated binary system with white or Gaussian noise added to the message signal before demodulation. The demodulator or detector may be assumed to be a linear envelope tracer but any other detector whose output is a monotonically increasing or decreasing function of the envelope amplitude would do just as well with suitable modification of the threshold circuit. Furthermore, for simplification, the probability of either signal pulses or no signal pulses occurring is taken as equally likely, that is $P=\frac{1}{2}$. Accordingly, Equation 1 reduces to a modified form of a Bessel function, namely, $$I_0(ax_0)-e^{\frac{-a^2}{2}}=0 \qquad (6)$$

from which $X_0$ in volts versus $a$ expressed as input signal-to-noise ratio in decibels may be plotted, as shown by the graph of $X_0$ in Fig. 1. This graph represents a plot of Equation 2 as derived from Equation 6.

The average value of signal plus noise plus the average value of noise alone, averaged for the time each is present, is given by the equation $$m=\frac{1}{2}\sqrt{\frac{\pi}{2}}\left[1+e^{\frac{-a^2}{4}}\left\{\left(1+\frac{a^2}{2}\right)I_0\left(\frac{a^2}{4}\right)+\frac{a^2}{2}I_1\left(\frac{a^2}{4}\right)\right\}\right] \qquad (7)$$

A plot of $m$ versus $a$ may also be plotted, as shown by the curve of $m$ in Fig. 1.

A form for $F(m)$ was empirically found which produced a curve intersecting the curve of $X_0$ at two points and closely approximating $X_0$ in the region of interest between these two intersecting points. This approximation to $X_0$ may be represented by the equation $$X_0=.848m+.29 \qquad (8)$$

which results in $X_0=X_0'$ where $a$ equals 2 and $a$ equals 8, a range from two to twelve decibels. The intermediate values of $X_0$ and $X_0'$ are approximately equal, as previously mentioned. The graph of $X_0'$ versus $a$ is also shown in Fig. 1. Thus, for practical purposes, $X_0'$ is a solution to Equation 1 as determined by Equation 7 and mathematically represents the optimum threshold setting to be applied to the threshold circuit for various signal-to-noise ratios.

Referring now to Fig. 2, there is shown an optimum binary threshold circuit, according to the present invention, that increases to substantially the theoretical maximum the probability that the voltage level of an output signal produced at a pair of output terminals 10*a* and 10*b* correctly corresponds to the type of input signal applied to a pair of input terminals 11*a* and 11*b*. Stated differently, the threshold circuit biases itself at a voltage level that at all times is substantially equal to the optimum threshold setting for the message signal and noise voltages applied to input terminals 11*a* and 11*b*.

As shown in Fig. 2, the threshold circuit comprises a low-pass filter circuit 12, a 0.848 attenuator circuit 13 and a 0.29 D.C. volts adder circuit 14 connected in tandem, filter circuit 12 being connected to input terminals 11*a* and 11*b*. Adder circuit 14 is coupled through a coupling capacitor 15 to a highly-sensitive amplifier 16 adjusted to produce an output signal only at either one of two voltage levels, the output end of the amplifier being connected to output terminals 10*a* and 10*b*. An example of such an amplifier is a suitably adjusted Schmitt trigger circuit which is shown and described on pages 57 through 59 of the book entitled "Time Bases," by O. S. Puckle, published in 1943 by John Wiley and Sons, Inc., New York, New York. A detector circuit 17 is connected between input terminal 11*a* and capacitor 15 and is, therefore, connected in parallel with the network comprising filter 12, attenuator 13 and adder 14.

Figure 3:
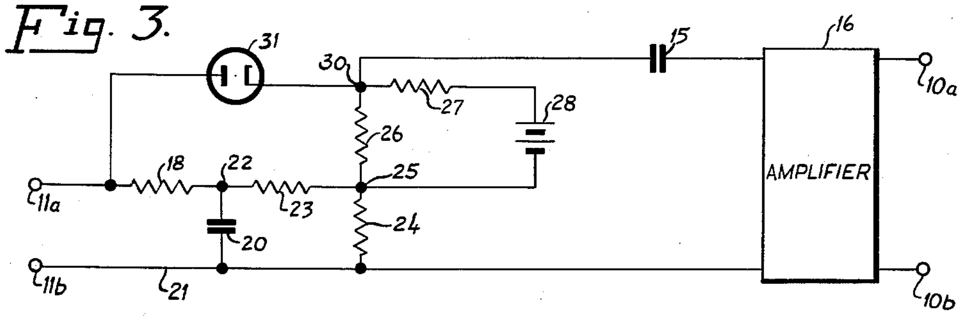
Fig. 3 is a circuit diagram, partly in block form, of the threshold circuit of Fig. 2.

The optimum binary threshold circuit of Fig. 2 is shown in greater detail in Fig. 3. More particularly, filter circuit 12 comprises a resistor 18 and capacitor 20 connected in series between terminal 11*a* and a common busbar 21 which is connected between input and output terminals 11*b* and 10*b*. One end of the resistor 18 is connected to input terminal 11*a* and one end of capacitor 20 is connected to busbar 21, the other ends of the resistor and capacitor having a junction 22.

Attenuator circuit 13 comprises a pair of resistors 23 and 24 connected in series between junction 22 and busbar 21, one end of resistor 23 being connected to junction 22 and one end of resistor 24 being connected to busbar 21, the other ends of the resistors being connected to each other at junction 25. Basically, resistors 23 and 24 constitute a voltage divider network, the voltage developed across resistor 24 being 0.848 of the voltage developed across capacitor 20. Accordingly, the value of resistance of resistor 24 divided by the sum of the values of resistance of resistors 23 and 24 should equal 0.848.

Adder 14 comprises a pair of resistors 26 and 27 and a source of D.C. voltage, such as a battery 28, connected in a loop, one end of resistors 26 and 27 being connected to each other at a junction 30, the other end of resistor 26 and the negative terminal of battery 28 being connected to junction 25. Basically, resistors 26 and 27 constitute a voltage divider network for the D.C. voltage developed by battery 28, the values of resistance of the resistors being such that the voltage developed across resistor 26 is equal to 0.29 volt. In other words, and assuming a 1 volt battery, the value of resistance of resistor 26 divided by the sum of the values of resistance of resistors 26 and 27 equals 0.29.

Detector circuit 17 comprises a diode 31 having an anode and a cathode, the anode being connected to input terminal 11*a* and the cathode to junction 30. The cathode of diode 31 is biased at a voltage level equal to the sum of the voltages developed across resistors 24 and 26 or, stated differently, at a voltage level equal to 0.29 volt plus 0.848 times the voltage developed across capacitor 20. Junction point 30 is coupled through capacitor 15 to amplifier 16 which, as previously mentioned, has its output connected to output terminals 10*a* and 10*b*.

Considering now the operation of the binary threshold circuit of Figs 2 and 3, when signals comprising message signal pulses as well as noise are applied to input terminals 11*a* and 11*b*, filter circuit 12 filters out the higher frequency components of the applied signals to produce a first voltage across capacitor 20 whose amplitude varies as the average of the amplitude of the applied signals. Thus, the first voltage produced across capacitor 20 is the electrical equivalent of $m$ in Equation 8. This first voltage is attenuated by attenuator circuit 13 which produces a second voltage across resistor 24 equal in amplitude to the first voltage multiplied by the factor 0.848. Thus, the second voltage produced across resistor 24 is the electrical equivalent of the term $0.848m$ in Equation 8. It was previously mentioned that adder 14 develops a direct-current voltage, equal to 0.29 volt, across resistor 26 of the adder. Accordingly, a back-biasing voltage is applied to the cathode of diode 31 equal to the sum of the 0.29 volt developed across resistor 26 and the second voltage developed across resistor 24. In other words, the back-biasing voltage is the electrical equivalent of the terms $0.848m+0.29$ in Equation 8, which is equal to $X_0'$. Thus, diode 31 and, therefore, the threshold circuit, is negatively biased at a voltage level substantially equal to the optimum threshold setting.

It will be recalled that amplifier 16 produces an output signal at output terminals 10*a* and 10*b* at either one of two voltage levels, the particular voltage level depending upon the type of signal applied to input terminals 11*a* and 11*b*. More specifically, when the amplitude of the signal applied to input terminals 11*a* and 11*b* is less than the threshold setting of diode 31, the diode remains back-biased and the output signal produced by amplifier 16 is at one of the two voltage levels. On the other hand, when the amplitude of the signal applied to input terminals 11*a* and 11*b* exceeds the threshold setting of diode 31, as is the case, for example, when message signal pulses are applied, the diode becomes forward biased and a triggering signal is applied to amplifier 16 which, in response thereto, produces the output signal at the other of the two voltage levels for the duration of the triggering signal. Thus, in response to message signal pulses, the threshold circuit makes the decision that a message signal pulse has been received at the input terminals.

It was previously mentioned that noise signals applied to input terminals 11*a* and 11*b* may cause the threshold circuit to make incorrect decisions as to the presence of message signal pulses at the input terminals. These incorrect decisions were previously referred to as commissive and omissive errors. However, it will be obvious to those skilled in the art that since diode 31 is biased substantially at the mathematically determined optimum threshold setting, the number of such errors will be reduced to substantially the theoretical minimum.

It should be noted that the diode detector shown in Fig. 3 may be replaced by a number of different detectors, each having a discrete probability distribution. Accordingly, for each such detector, the optimum threshold setting would be determined by a different mathematical expression. However, if, for a given detector, $X_0$ is a linear function of $a$, then any other envelope function detector whose output is a monotonic function of its input will have an optimum threshold setting $Y_0$ related to $X_0$ as follows:

If $$X_0=f(a)=a \tag{9}$$

and $$Y_0=g(a) \tag{10}$$

then $$Y_0=g(X_0) \tag{11}$$

It should also be noted that the adder may be replaced by a germanium crystal diode, the contact potential of the germanium diode being used to provide the direct-current voltage produced by the adder to bias the detector diode. It will be recognized, however, that if the contact bias is significantly different from the desired value, a new value of attenuation could be chosen for the attenuator to bring $X_0'$ back close to $X_0$.

What is claimed as new is:

1. An optimum binary threshold circuit for reducing to substantially the theoretical minimum the number of errors made in distinguishing between applied message and noise signals both varying in an unrelated manner, said circuit comprising: a low-pass filter circuit for filtering out predetermined higher frequency components of the applied signals to produce a first voltage having an amplitude $m$ varying as the average of the instantaneous sum of the amplitudes of the applied signals; an attenuator circuit connected to said filter circuit and having an attenuation factor equal to 0.848, said attenuation circuit attenuating said first voltage to produce a second voltage equal in amplitude to $0.848m$; means for producing a direct-current voltage equal to 0.29, said means being connected to said attenuator circuit for adding said direct-current voltage to said second voltage to produce a third voltage equal in amplitude to $0.848m+0.29$; a detector circuit connected across said filter and adder circuits and normally maintained non-conductive by said fourth voltage, said detector circuit being rendered conductive when the amplitude of the applied signals exceeds said third voltage to produce a triggering pulse; and an amplifier electrically coupled to said detector circuit for producing an output signal at either one of two predetermined voltage levels, said amplifier normally producing said output signal at one of said voltage levels and being responsive to said triggering pulse for producing said output signal at the other one of said two voltage levels.

2. An optimum binary threshold circuit for reducing to substantially the theoretical minimum the number of errors made in distinguishing between message and noise signals applied to first and second input terminals, said second input terminal being connected to a common junction, said circuit comprising: a low-pass filter circuit comprising a first resistor and a first capacitor connected in series between the first input terminal and the common junction, one end of said first resistor being connected to the first input terminal and one end of said first capacitor being connected to the common junction, the other ends of said first resistor and capacitor being connected to a first junction; an attenuator circuit comprising second and third resistors connected in series between said first and common junctions and connected to each other at a second junction, the value of resistance of said third resistor divided by the sum of the values of resistance of said second and third resistors being a first predetermined ratio; an adder circuit comprising fourth and fifth resistors and a source of direct-current voltage connected in a loop, one end of said fourth and fifth resistors being connected to a third junction and the other end of said fourth resistor and the negative terminal of said source being connected to said second junction, the value of resistance of said fourth resistor divided by the sum of the values of resistance of said fourth and fifth resistors being a second predetermined ratio; a diode having a cathode and an anode, said cathode being connected to said third junction and said anode being connected to the first input terminal; and amplifier for producing an output signal at either one of two voltage levels, said amplifier output signal being at one output level when said diode is back-biased and at the other output level when said diode is forward-biased; and a coupling capacitor connected between said third junction and said amplifier.

3. An optimum binary threshold circuit for reducing to substantially the theoretical minimum the number of errors made in distinguishing between message and random noise signals applied to first and second input terminals, said second input terminal being connected to a common junction, said circuit comprising: a low-pass filter circuit comprising a first resistor and a first capacitor connected in series between the first input terminal and the common junction, one end of said first resistor being connected to the first input terminal and one end of said first capacitor being connected to the common junction, the other ends of said first resistor and capacitor being connected to each other at a first junction; an attenuator circuit comprising second and third resistors connected in series between said first and common junctions and connected to each other at a second junction, one end of said second resistor being connected to said first junction and one end of said third resistor being connected to said common junction, the value of resistance of said third resistor divided by the sum of the values of resistance of said second and third resistors being equal to 0.848; an adder circuit comprising fourth and fifth resistors and a source of direct-current voltage connected in a loop, one end of said fourth and fifth resistors being connected to each other at a third junction and the other end of said fourth resistor and the negative terminal of said source of voltage being connected to said second junction, the product of the value of resistance of said fourth resistor and the value of direct-current voltage divided by the sum of the values of resistance of said fourth and fifth resistors being equal to 0.29; a diode having a cathode and an anode, said cathode being connected to said third junction and said anode being connected to the first input terminal; an amplifier for producing an output signal at either one of two voltage levels, said output signal being at one voltage level when said diode is back-biased and at the other voltage level when said diode is forward-biased; and a coupling capacitor connected between said third junction and said amplifier.

4. A threshold voltage circuit comprising: a low-pass filter circuit having a pair of input terminals for receiving input signals; a voltage divider circuit having its input connected to the output of said filter circuit, a constant voltage circuit having its input connected to the output of said voltage divider circuit for adding a constant voltage to an output voltage developed by said voltage divider circuit when input signals are applied to the input terminals of said filter circuit, a rectifier having one electrode connected to the input of said filter circuit and having the other electrode connected to the output of said constant voltage circuit, said rectifier being connected with a polarity such that it is biased to be nonconductive by the sum of said constant voltage and the output voltage developed by said voltage divider circuit; and output circuit means having its input coupled to the output of said constant voltage circuit.

References Cited in the file of this patent

UNITED STATES PATENTS

| | | |
|---|---|---|
| 2,518,449 | Coe | Aug. 15, 1950 |
| 2,525,298 | Hughes | Oct. 10, 1950 |

FOREIGN PATENTS

| | | |
|---|---|---|
| 639,183 | Great Britain | June 2, 1950 |

UNITED STATES PATENT OFFICE
CERTIFICATION OF CORRECTION

Patent No. 2,963,653 December 6, 1960

Richard A. Campbell

It is hereby certified that error appears in the above numbered patent requiring correction and that the said Letters Patent should read as corrected below.

Column 3, lines 20 to 24, the equation (7) should appear as shown below instead of as in the patent:

$$m=\frac{1}{2}\sqrt{\frac{\pi}{2}}\left[1+e^{\frac{-a^2}{4}}\left\{\left(1+\frac{a^2}{2}\right)I_0\left(\frac{a^2}{4}\right)+\frac{a^2}{2}I_1\left(\frac{a^2}{4}\right)\right\}\right]$$

column 3, line 32, equation (8) should appear as shown below instead of as in the patent:

$$X'_0=.848m+.29$$

column 6, line 25, for "and" read -- an --.

Signed and sealed this 13th day of June 1961.

(SEAL)
Attest:

ERNEST W. SWIDER
Attesting Officer

DAVID L. LADD
Commissioner of Patents